UNITED STATES PATENT OFFICE.

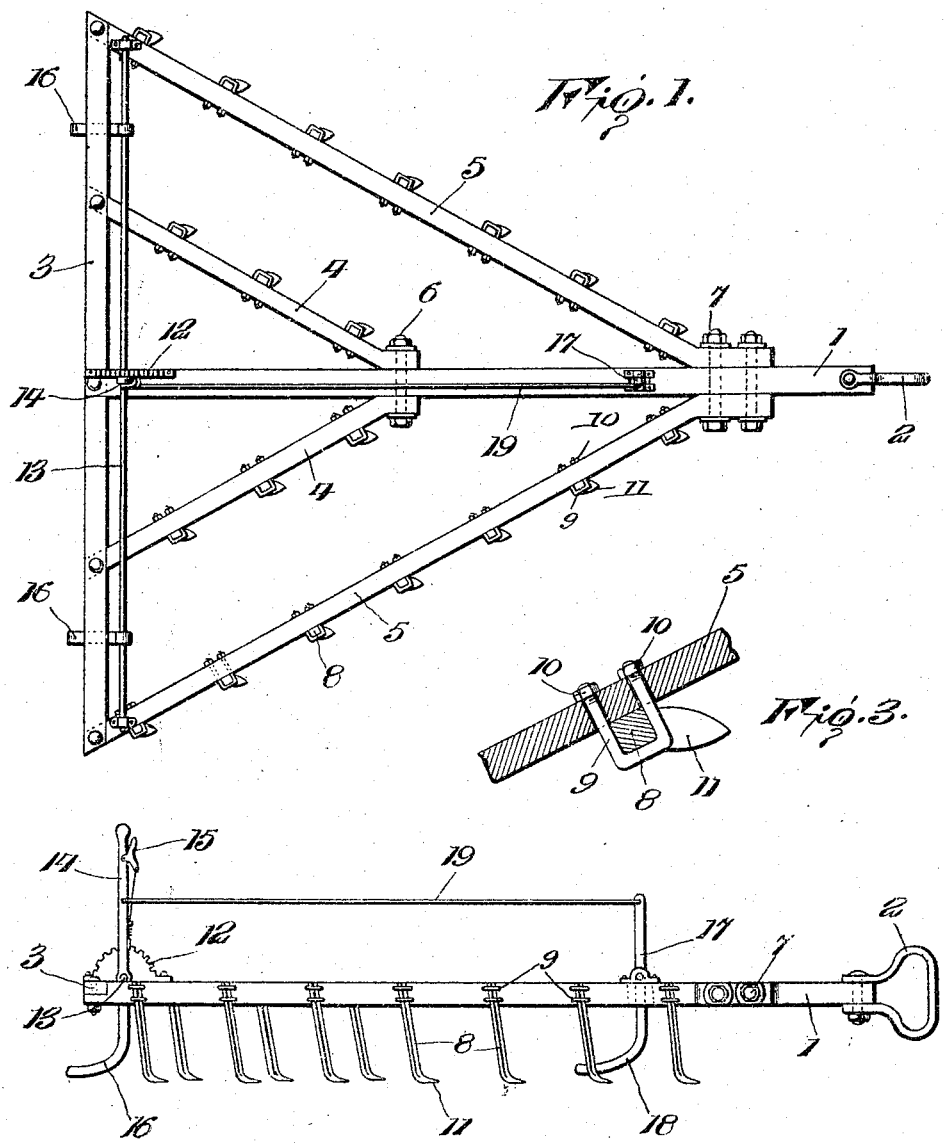

JEFFERSON D. GARRETT, OF WINNSBORO, TEXAS.

HARROW.

1,286,581. Specification of Letters Patent. Patented Dec. 3, 1918.

Application filed January 12, 1917. Serial No. 142,022.

*To all whom it may concern:*

Be it known that I, JEFFERSON D. GARRETT, a citizen of the United States, residing at Winnsboro, in the county of Wood and State of Texas, have invented certain new and useful Improvements in Harrows, of which the following is a specification.

This invention relates to harrows and has for its object the provision of a simple, inexpensive and efficient implement by which roots of weeds and obnoxious grasses may be removed from the ground and destroyed, the ground being, at the same time, left in proper condition to promote growth of desirable plants. One object of the invention is to provide simple means whereby the implement may be readily relieved of an accumulation of roots and trash which tends to clog its operation and defeat its purpose.

The invention is illustrated in the accompanying drawings, in which—

Figure 1 is a plan view of a harrow embodying my improvements;

Fig. 2 is a side elevation of the same;

Fig. 3 is a detail horizontal section showing the manner of securing the harrow teeth.

In carrying out my invention, I employ a substantially triangular frame comprising a central beam or draft bar 1 having a clevis 2 attached to its front end so that the draft animals may be readily hitched thereto. To the rear end of this main beam or draft bar, I secure a cross beam 3 and forwardly converging beams 4 and 5 extend from the cross beam 3 to the central beam or draft bar. The rear ends of the beams 4 are secured to the cross beam at points about midway between the center of said beam and the ends thereof and the front ends of the said beams 4 are secured to the draft bar by a bolt 6 inserted through the same and the ends of the beam 4, as clearly shown. The beams 5 are secured at their front ends to the draft bar 1 by a bolt 7 in the same manner and the rear ends of these beams 5 are secured to the ends of the beam 3, as clearly shown. The harrow teeth 8 are secured to the beams 4 and 5 by U-bolts 9 fitted around the shanks of the teeth and inserted through the beams 4 and 5, as shown, nuts 10 fitted on the ends of the U-bolts and turned home against the beams serving to clamp the teeth firmly against the forward sides of the beams. The lower ends of the harrow teeth are turned forwardly, as shown at 11, so that they will readily pass under the roots to be withdrawn from the ground and the shanks of the teeth are so arranged that they extend slightly forward, as well as downwardly from the beams, so that they will more readily withstand the strain placed upon them. Upon the draft bar 1, at the rear end thereof, is a segmental locking plate 12, which is disposed concentrically with a rock shaft 13 journaled in suitable bearings upon said draft bar and upon the beams. A lever 14 is secured on this rock shaft, at the center of the same, and is equipped with a latch 15, of the usual construction, to engage the holding segment 12 and thereby maintain the lever in any position in which it may be set. Near the ends of the rock shaft 13, I rigidly secure thereto shoes or runners 16 which depend from the rock shaft and have their lower ends turned rearwardly, as clearly shown. Near the front ends of the beams, I pivotally mount upon the draft bar a lever 17 which has its lower end equipped with a shoe or runner 18, similar in all respects to the shoes or runners 16, and the upper end of this lever 17 is connected by a link 19 with the operating lever 14.

The use of my device is thought to be evident from the foregoing description, taken in connection with the accompanying drawings. The implement is drawn over the field and the teeth will take into the ground so as to engage under and uproot obnoxious growths. The shoes or runners 16 and 18 may be set so as to clear the ground, as illustrated in the drawings, or the levers may be adjusted so that the said shoes or runners will press lightly upon the surface and thereby prevent the harrow penetrating to such a depth as will unnecessarily increase the draft and thereby impose increased strain upon the draft animals. As the roots and grasses are turned up by the harrow teeth, they will tend to drag thereon and will ordinarily accumulate in front of the teeth so that eventually the harrow will be clogged and will not perform the desired work. In such event, the operating lever 14 is swung rearward and the several shoes or runners will thereby be caused to impinge against the surface of the ground and lift the frame and the teeth so that the accumulated trash and grass will be discharged in a pile and may be easily gathered and carried to any place of disposal.

Having thus described the invention, what is claimed as new is:

A harrow including substantially triangular shaped inner and outer frames, a draft bar connecting said frames, a clevis secured to the draft bar at a point spaced from the apex of the outer frame, vertically adjustable teeth secured to the outer faces of the converging sides of the inner and outer frames and extending for the entire length thereof and each including a shank substantially rectangular in cross section and extending downwardly and forwardly from the adjacent frame, the free end of the shank of each tooth being flattened and disposed at substantially right angles to the shank and at an angle to the side of the adjacent supporting frame, the terminals of the teeth being pointed and extended in the direction of the draft clevis, and U-shaped fastening devices extending through the converging sides of the frames and engaging the shanks of the teeth for clamping said teeth in adjusted position.

In testimony whereof I affix my signature.

JEFFERSON D. GARRETT. [L. S.]

Copies of this patent may be obtained for five cents each, by addressing the "Commissioner of Patents, Washington, D. C."